Figure 4:
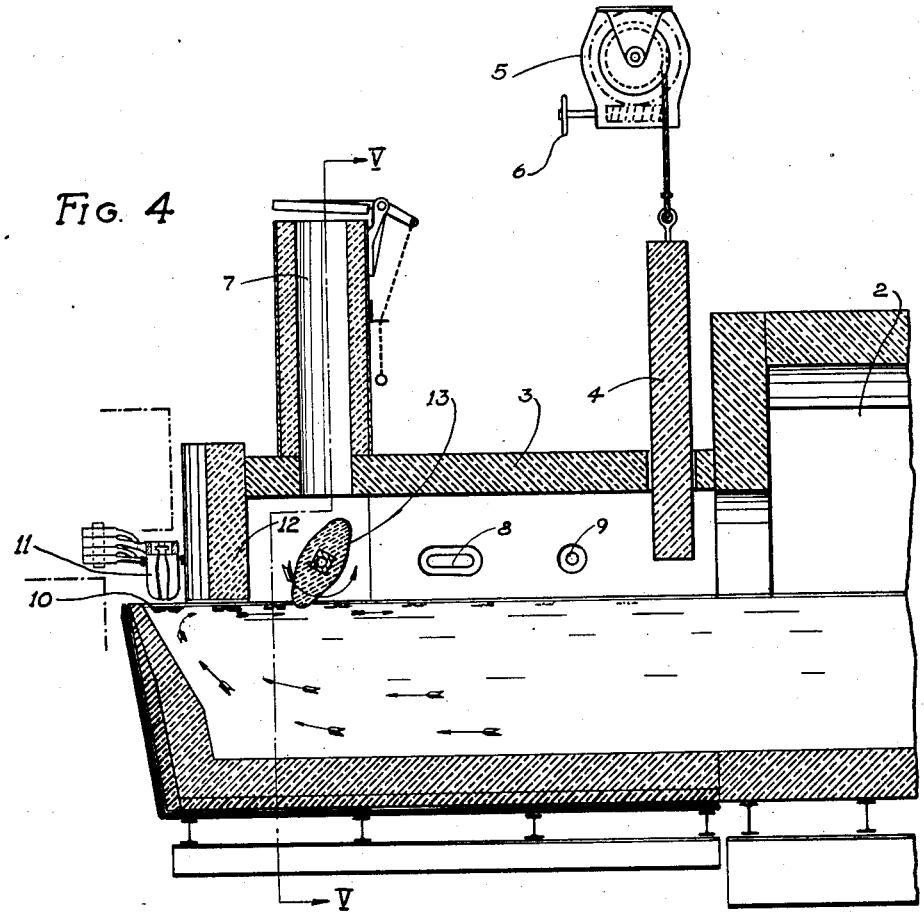

Sept. 19, 1933.  P. L. GEER  1,927,658
GLASS MELTING FURNACE
Filed Sept. 30, 1930    2 Sheets-Sheet 1
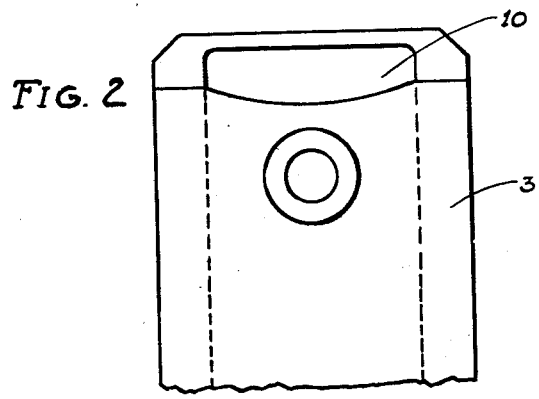
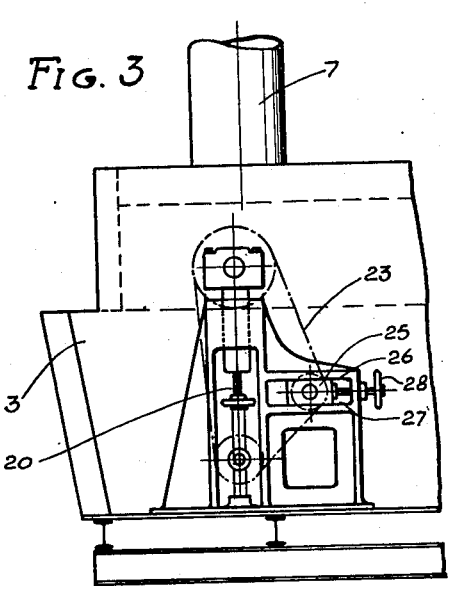
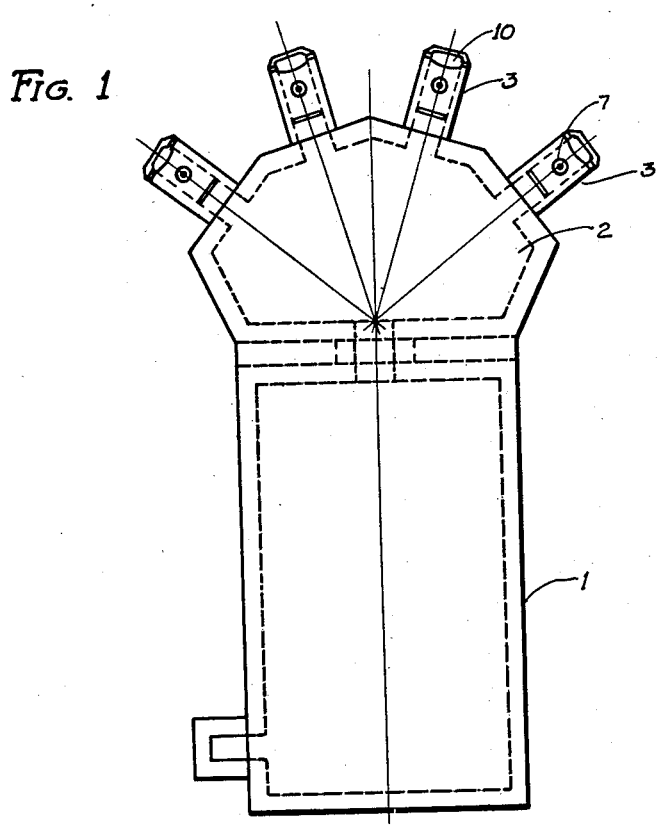
INVENTOR.
Paul L. Geer
BY William B. Jaspert
ATTORNEY.

Sept. 19, 1933.  P. L. GEER  1,927,658
GLASS MELTING FURNACE
Filed Sept. 30, 1930    2 Sheets-Sheet 2

INVENTOR.
Paul L. Geer
BY William B. Jaspert
ATTORNEY.

Patented Sept. 19, 1933

1,927,658

UNITED STATES PATENT OFFICE 1,927,658

GLASS MELTING FURNACE

Paul L. Geer, Bellevue, Pa., assignor to Amco, Incorporated, Pittsburgh, Pa., a corporation of Pennsylvania Application September 30, 1930
Serial No. 485,482

4 Claims. (Cl. 49—54)

This invention relates to forehearth structures for suction machines, and it is among the objects thereof to provide a forehearth structure and means for moving glass therein which shall be adapted to provide a fresh batch of molten glass for the successive charges of the gathering molds of suction forming machines.

Another object of the invention is the provision of apparatus for agitating the surface glass to remove the chilled tailings from the mold suction end of the forehearth.

Another object of the invention is the provision of means for subjecting the chilled glass to proper reducing temperature in the forehearth per se, thereby eliminating the necessity for returning it to the refining chamber of the melting tank.

These and other objects of this invention will become more apparent from a consideration of the accompanying drawings in which like reference characters designate like parts and in which Figure 1 is a plan view of a glass melting tank, refining chamber, and forehearth, embodying the principles of this invention; Figure 2, a plan view of a portion of the forehearth showing the opening through which the suction molds receive their charge of glass; Figure 3, a side elevational view of a portion of the forehearth illustrating the agitating mechanism for receiving the surface of the pool; and Figure 4, a longitudinal cross sectional view of the forehearth and a portion of the refining chamber; and Figure 5, a transverse section taken along the line V—V, Figure 4.

With reference to the several figures of the drawings, reference character 1 designates the melting furnace; 2 the refining chamber; and 3 generally designates a series of forehearths disposed radially from the refining chamber, there being as many forehearths as there are machines for receiving their charges of glass from the refining chamber.

Figure 5:
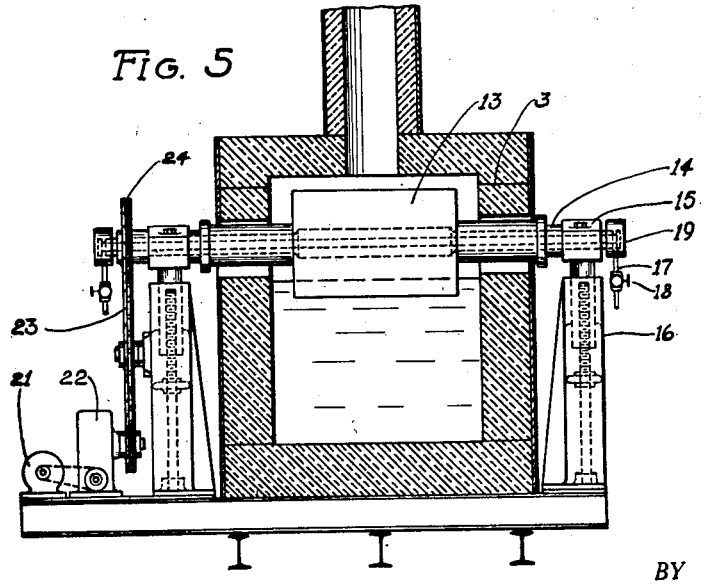

With particular reference to Figures 4 and 5 of the drawings the forehearth 3 has a roof somewhat lower than the rest of the refining chamber 2 to provide a heating chamber of minimum volume, but the floor of the forehearth is on the same level as the floor of the refining chamber to provide a glass pool of substantially uniform depth with the pool in the refining chamber, thereby maintaining a maximum volume of glass in the forehearth to more readily maintain the glass at uniformly working temperature at the gathering point.

A gate 4 is provided at the rear of the forehearth 3 which is vertically movable through a screw and nut mechanism 5 operated by a hand wheel 6, this gate being raised or lowered depending upon whether the temperature of the forehearth chamber is maintained from the hot gases of the refining chamber which are drawn forward and passed out of the stack 7 with the gate 4 in its raised position or whether it is desired to heat the forehearth chamber locally by burners disposed through burner ports 8 and 9 with the gate 4 in its lowered position. The gate may also be used for the purpose of permitting colder or hotter glass to flow toward the open part of the forehearth depending upon the depth of the gate in the glass.

The foremost portion of the forehearth is provided with an opening 10 through which the parison molds 11 of a suction forming machine is inserted to engage the surface of the pool of glass when receiving its charge. Adjacent the opening is provided a front wall 12 which helps to maintain the heat in the forehearth chamber, and this also functions to expose a minimum surface of the glass pool.

A surface agitating mechanism, such as a revolving paddle, is provided to withdraw the surface glass from the portion of the pool in the region of the opening 10 and conduct it to the interior of the forehearth chamber, such mechanism comprising a refractory member 13 illustrated as of substantially elliptical shape but which may be of other form, said member extending across substantially the entire width of the glass pool, as shown in Figure 5. The member 13 is mounted to rotate on a shaft 14 which is constructed of highly heat-resistant alloy and which is journalled at its respective ends in journal bearings 15 that are adjustably mounted in side brackets 16. The shaft 14 is provided with passages for conducting a cooling medium such as water which is supplied through pipe line 17 having control valves 18 to control the rate of flow of the cooling fluid. The fluid supply line 17 is connected to the shaft 14 through a suitable packing box 19 that will effect a water tight joint without interfering with the rotation of the shaft 14.

The journal bearings 15 are vertically adjusted through a screw and nut mechanism generally designated at 29 to raise or lower the refractory paddle 13 to vary its depth in the glass pool of the forehearth and the shaft 14 is actuated through a suitable drive mechanism comprising a motor 21 and suitable reduction gear mechanism 22 connected by a drive chain 23 to a wheel 24 that is mounted to rotate with the shaft 14.

Provision is made for taking up the slack of the chain 23 when the bearings 15 are adjusted, suitable mechanism for this purpose comprising an idler wheel 25 which is journalled on a slide block 26 disposed in a guide extension 27 of the side brackets 16, the block 26 being movable horizontally through a hand wheel operated screw and nut mechanism 28.

The operation of the circulating mechanism and the forehearth structure for maintaining glass of uniform temperature and quality therein, is briefly as follows: On account of the substantial depth of glass pool in the forehearth structure which is the same as the depth of the glass in the refining tank, the glass is maintained at a substantially uniform temperature in the region of the opening 10 and the tailings or chilled glass which is sheared from the bottom of the suction molds, drops back on the surface of the pool and is drawn into the forehearth chamber by rotation of the paddle 13. The member 13 rotates in the direction shown by the arrow causing the surface of the glass to flow away from the opening 10 into the chamber of the forehearth in which it is reduced to its proper working temperature by either the hot gases drawn through the stack 7 when the gate 4 is in its raised position or by means of heat applied through the burner ports 8 and 9 in which case the gate 4 is in its lowered position. In either case the chilled glass is quickly reduced to suitable working temperature, and on account of the surface agitation of the glass pool, the surface glass at the opening 10 of the forehearth is constantly replaced by fresh glass coming up from beneath thereby assuring uniform quality of glass for the suction molds.

By adjustment of the vertical screw mechanism and the chain tension device, the rotating member 13 can be readily lowered and raised in its position with respect to the pool of glass in the forehearth, thereby controlling the volume of glass displacement in the front portion of the forehearth, thus assuring sufficient circulation to replace chilled surface glass regardless of the speed of operation of the suction forming machines.

As shown in Fig. 1, any number of such forehearths as are disclosed in Figures 4 and 5, may be associated with the refining chamber of a glass melting tank to provide glass for an equal number of suction forming machines and by employing the temperature control and the circulating mechanism herein described, a suitable and adequate supply of glass is rendered available at all times.

Although one embodiment of the invention has been herein illustrated and described, it will be obvious to those skilled in the art that various modifications may be made in the details of construction without departing from the principles herein set forth.

I claim:

1. In a glass melting furnace the combination with a refining chamber of a forehearth extending therefrom, said forehearth having a wall structure extending above the level of the glass pool to form a heating chamber, and having an extension to expose a portion of the glass pool outside of said chamber, means extending across substantially the entire width of said chamber for engaging the surface of the pool within said chamber to effect circulation of glass from the bottom of said exposed portion to the top and rearwardly to the interior of the chamber, and means for heating the glass in said forehearth chamber.

2. In a glass melting furnace the combination with a glass refining chamber of a hearth extending from said chamber in the same plane as the hearth of said refining chamber, front and side closure walls for said forehearth and a movable wall separating said forehearth and refining chambers, the front wall of said extension chamber being set back from the front of the hearth to expose a portion of the glass pool, means for agitating the glass in the upper region of the pool to cause vertical flow of the glass from the bottom of the pool to the surface of the exposed portion of the pool and to draw the surface glass from the exposed portion of the pool in a lateral direction to within the forehearth chamber, and means for heating the glass in the extension chamber to proper working temperature.

3. In a glass melting furnace, a forehearth structure, front and side closure walls for said forehearth with the front wall set back from the front of the hearth to expose a portion of the glass pool, an adjustable gate constituting the rear wall of said forehearth, burner ports in said forehearth wall, and a rotary paddle mounted to engage the glass within the forehearth chamber said paddle having its axis disposed parallel to the surface of the glass in the pool and being supported on adjustable frames on the exterior of the forehearth walls to vary the depth of the paddle in the glass pool.

4. In a glass melting furnace, a forehearth structure having its hearth on a level with the hearth of the melting furnace, front and side closure walls for said forehearth with the front wall set back from the front of the hearth to expose a portion of the glass pool, an exhaust flue adjacent the front wall of the forehearth chamber at the interior of said chamber, a glass circulating member for engaging the surface of the glass beneath said flue, and an adjustable gate constituting the rear wall of said forehearth and controlling the flow of hot gases from the melting chamber to the forehearth.

PAUL L. GEER.